US008024378B2

(12) United States Patent
Peura et al.

(10) Patent No.: US 8,024,378 B2
(45) Date of Patent: Sep. 20, 2011

(54) SYSTEM AND METHOD TO REDUCE THE PROMOTION RATE IN A GENERATIONAL GARBAGE COLLECTOR IN A VIRTUAL MACHINE ENVIRONMENT

(75) Inventors: Noora Peura, Stockholm (SE); David Lindholm, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 301 days.

(21) Appl. No.: 11/954,107

(22) Filed: Dec. 11, 2007

(65) Prior Publication Data

US 2008/0154995 A1    Jun. 26, 2008

Related U.S. Application Data

(60) Provisional application No. 60/871,089, filed on Dec. 20, 2006.

(51) Int. Cl.
*G06F 12/00* (2006.01)

(52) U.S. Cl. ....................................................... 707/813

(58) Field of Classification Search .................. 707/813, 707/999.206
See application file for complete search history.

(56) References Cited

U.S. PATENT DOCUMENTS

| | | | |
|---|---|---|---|
| 6,681,306 B1* | 1/2004 | Kessler et al. | 711/171 |
| 6,934,755 B1* | 8/2005 | Saulpaugh et al. | 709/226 |
| 7,584,231 B1* | 9/2009 | Daynes et al. | 707/206 |
| 2002/0133533 A1* | 9/2002 | Czajkowski et al. | 709/107 |
| 2004/0168030 A1* | 8/2004 | Traversat et al. | 711/133 |
| 2006/0294165 A1* | 12/2006 | Bacon et al. | 707/206 |

* cited by examiner

*Primary Examiner* — John R. Cottingham
*Assistant Examiner* — Mohammad R Uddin
(74) *Attorney, Agent, or Firm* — Fliesler Meyer LLP

(57) ABSTRACT

A system for generational garbage collection in a virtual machine environment, comprising a virtual machine for executing a software application; a memory space for use by the virtual machine in storing software objects and pointers as part of the software application, divided into a three space nursery and an old space heap; a nursery garbage collector that can collect two out of the three spaces to reduce the promotion rate; and an old space garbage collector.

20 Claims, 3 Drawing Sheets

US 8,024,378 B2

SYSTEM AND METHOD TO REDUCE THE PROMOTION RATE IN A GENERATIONAL GARBAGE COLLECTOR IN A VIRTUAL MACHINE ENVIRONMENT

CLAIM OF PRIORITY

This application claims the benefit of U.S. Provisional Application No. 60/871,089 entitled "SYSTEM AND METHOD TO REDUCE THE PROMOTION RATE IN A GENERATIONAL GARBAGE COLLECTOR IN A VIRTUAL MACHINE ENVIRONMENT", filed Dec. 20, 2006, and herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to virtual machine environments and other run-time environments, and in particular to object allocation and garbage collection within such an environment.

BACKGROUND

Virtual machines are abstract computers for which application software can be compiled. The virtual machine is thus an abstraction level for application software that is consistent between different hardware and operating system combinations. Most of the complexity in running the same application on different platforms is handled by the virtual machine and therefore the virtual machine becomes a very complex piece of software. Modern virtual machines need to manage code generation for the particular processor, operating system dependent resources like threads, networking, and file system. The virtual machine also manages the heap, within which allocation and freeing of virtual machine objects is performed. Examples of such virtual machines include the Java Virtual Machine (JVM) and implementations thereof, including the JRockit JVM from BEA Systems Inc. and the Hotspot JVM from Sun Microsystems, Inc. The definition of the Java Virtual Machine (JVM) does not specify any requirements on the performance or the behaviour of the garbage collection process apart from basic assumptions such as: unused memory should be reused for new objects, and finalizers should be called when objects are to be released. The exact details are explained in the book "The Java™ Virtual Machine Specification (2nd Edition)" by Tim Lindholm published by Sun, and incorporated herein by reference. The JVM implementor can therefore choose to optimize different kinds of behaviours depending on the requirements of the application software and the features of the particular hardware used. A perfect garbage collector would be undetectable to the application software and the software user; there would be no pauses, no extra CPU or memory consumption. Unfortunately no such garbage collector exists, and a lot of work has been invested into achieving high performance object allocation and garbage collection with different algorithms for different goals.

SUMMARY

Disclosed herein is a system and method for three space nursery collection in a virtual machine (VM), or other runtime environment, and particularly for use in a system that includes a Java Virtual Machine (JVM). As described above, nursery collection is beneficial for transaction-based applications. Unfortunately, current techniques used for nursery collection unnecessarily promote objects that would have been released if only the young collection had been performed later.

An embodiment of the present invention addresses this problem by providing a system and method to maintain and garbage collect a nursery and improve the performance of transaction-based services. In accordance with an embodiment, the invention provides a system for nursery garbage collection in a virtual machine environment, comprising: a virtual machine for executing a software application; a memory space for use by the virtual machine in storing software objects and pointers as part of the software application, divided into a three space nursery and an old space heap; a nursery garbage collector that collects two nursery spaces out of the three to reduce the promotion rate; and an old space garbage collector.

In accordance with another embodiment of the invention, the three nursery spaces are divided into a body and two tails where the body is larger than a tail.

In accordance with another embodiment of the invention, the size of the tails compared to the body can be tuned to adapt to the application behavior.

Additional embodiments, modifications and variations based on the provided description will be apparent to the practitioner skilled in the art.

DETAILED DESCRIPTION

Figure 1:
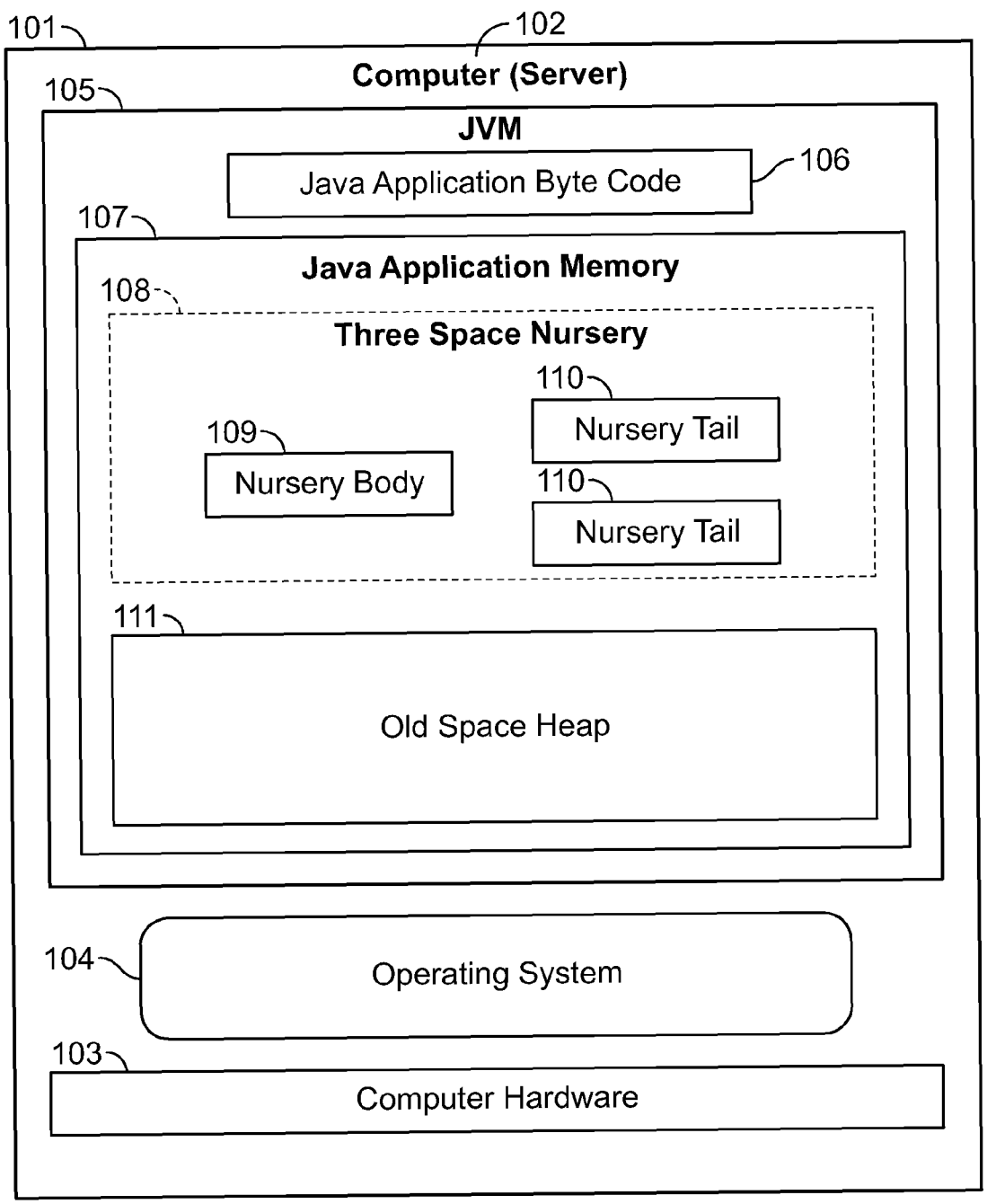
FIG. 1 shows an illustration of a system in accordance with an embodiment, that uses a three space nursery in combination with an old space heap.

Disclosed herein is a system and method for three space nursery collection in a virtual machine (VM), or other runtime environment, and particularly for use in a system that includes a Java Virtual Machine (JVM).

One technique to reduce the pause times is to use a generational garbage collector. A generational garbage collector allocates objects within a nursery (young space). Objects surviving a nursery collection are assumed to be long-lived objects, and therefore moved to the old space heap which is collected more seldom. The increase in efficiency is based on the assumption that objects die young and it is faster for the garbage collector to collect the small nursery heap and to avoid a full collection of the larger old space heap.

However a generational garbage collector needs to perform extra bookkeeping to be able to find all live objects within the nursery. For example, if the application stores a pointer to an object within the nursery into an object located in the old space, a write barrier traps the write and marks the area in the old space as dirty. This means that to find all live objects inside the nursery, the garbage collector has to walk through all thread roots (thread stacks and global static variables), as well as all objects within dirty areas in the old space. When a pointer to an object located in the nursery is found, the object is moved to the old space (promoted) and this will require updating of all pointers (both in memory and in registers) to the promoted object. The nursery is used up sequentially, but instead of allocating objects directly in the nursery, thread local areas (TLAs) are allocated sequentially. The TLA size varies but is normally around 4 kb. Each working thread is given a TLA within which it can allocate its own objects sequentially without taking any global lock. When there is no more space within the nursery to allocate the next TLA, a young collection (nursery collection) is performed. After the nursery collection, the nursery is empty and all objects found live within the nursery have been promoted to the old space.

If the application only stores few pointers to allocated objects into objects in the old space then the amount of potentially live objects in the old space will increase slowly. This is of course application dependent, but applications that behave in this way are typically transaction based applications.

Transaction based systems servicing requests where the requests are transformed into database queries benefit highly from running with a generational garbage collector. Since almost all objects allocated while servicing a request can be released when the transaction is complete, if the majority of these objects are allocated in the nursery and are not found live at the time of the nursery collection.

Eventually the old space free lists are used up and an old space collection needs to be performed to find all live objects on the full heap, and gather new free lists based on the available space between the live objects.

Unfortunately, even though a multithreaded transaction-based application is using a nursery, the garbage collector might not behave optimally. For example, when the nursery collection needs to be performed, several application transactions are probably halfway from being complete. The objects in use will be promoted to the old space and remain in the old space until the next old collection. Unnecessary promotion will cause the old collection to arrive earlier than if the objects had not been promoted. Promotion itself is also costly because of memory bandwidth limitations in modern hardware.

One technique to reduce this problem is to make the nursery larger. Then the cost of unnecessary promotion is spread out over more transactions. Unfortunately, larger nurseries limit the amount of old space and this can be a serious problem for applications running within 32 bit environments. Any new technique to reduce the number of promotions during nursery collections without actually increasing the size of the nursery would improve performance significantly.

As described above, nursery collection is beneficial for transaction-based applications. Unfortunately, current techniques used for nursery collection unnecessarily promote objects that had been released if only the young collection had been performed later. Current techniques used for nursery garbage collection also promote objects that need not be promoted and this causes performance problems.

An embodiment of the present invention addresses this problem by providing a system and method to maintain and garbage collect a nursery and improve the performance of transaction-based services. In accordance with an embodiment, the invention provides a system for nursery garbage collection in a virtual machine environment, comprising: a virtual machine for executing a software application; a memory space for use by the virtual machine in storing software objects and pointers as part of the software application, divided into a three space nursery and an old space heap; a nursery garbage collector that collects two nursery spaces out of the three to reduce the promotion rate; and an old space garbage collector.

FIG. 1 shows an illustration of a system in accordance with an embodiment, that uses a three space nursery in combination with an old space heap. As shown in FIG. 1, the system 101 comprises a computer server 102 that further comprises a computer hardware 103. The computer hardware is running an operating system 104. A virtual machine such as a Java Virtual Machine 105 runs within the operating system. The JVM contains the application software as byte code 106. When the application software is running it makes use of the Java application memory 107 which contains a three space nursery 108 comprising a nursery body 109 and two nursery tails 110. The Java application memory also contains the old space heap 111 to which objects are promoted from the three space nursery.

Figure 2:
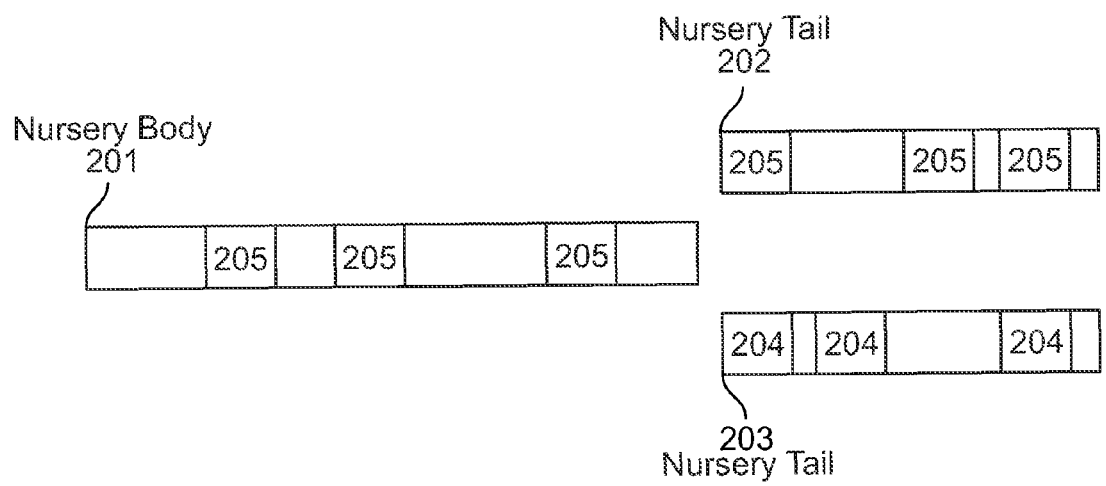
FIG. 2 shows a schematic of the memory layout in accordance with an embodiment, for a three space nursery just prior to a young collection.

FIG. 2 shows a schematic of the memory layout in accordance with an embodiment, for a three space nursery just prior to a young collection. As shown in FIG. 2, the three space nursery is divided into a nursery body 201 and two nursery tails 202 and 203. Nursery tail 203 contains objects 204 not promoted during the previous nursery collection. The body and the other tail contains the objects 205 allocated since the previous nursery collection.

During the upcoming nursery collection, the nursery body 201 and the nursery tail 203 will be garbage collected, and all live objects found within these two spaces will be promoted to the old space heap. The objects 205 will not be promoted and saved in the nursery until the next young collection.

Figure 3:
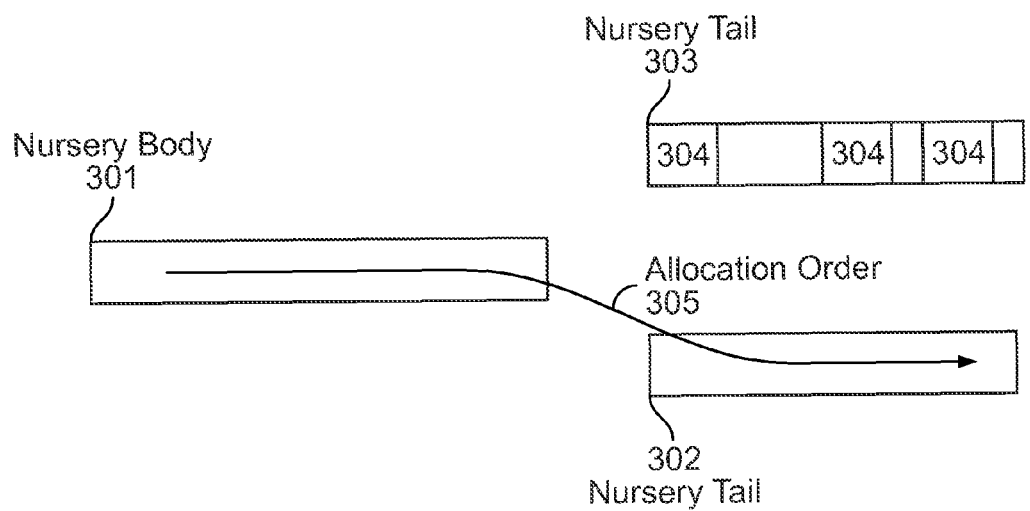
FIG. 3 shows a schematic of the memory layout in accordance with an embodiment, for a three space nursery just after a young collection.

FIG. 3 shows a schematic of the memory layout in accordance with an embodiment, for a three space nursery just after a young collection. As shown in FIG. 3, the nursery body 301 and the nursery tail 302 are now empty. The nursery tail 303 with its objects 304 will remain until the next young collection. The allocation order of nursery memory will follow the path 305 from the nursery body into the free nursery tail. As can be seen from FIG. 3, the nursery body is larger than the tails and a tail is large enough to contain the memory needed for a few transactions. The nursery tail will then with a high probability contain the live objects belonging to halfway transactions. Since the application is transaction-based there is a high probability that these objects will not be promoted at all, but instead garbage collected during the next young collection.

Figure 4:
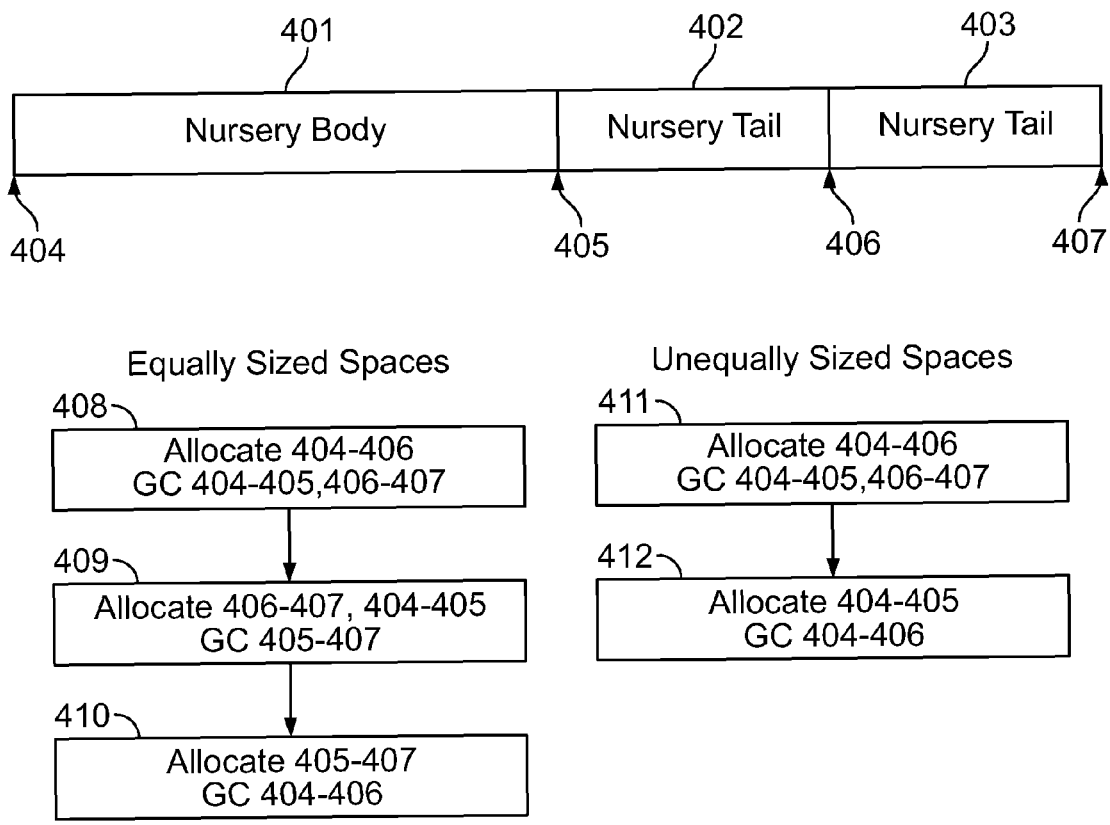
FIG. 4 shows a schematic of the memory layout of the three space nursery for efficient implementation in accordance with an embodiment.

FIG. 4 shows a schematic of the memory layout of the three space nursery for efficient implementation in accordance with an embodiment. As shown in FIG. 4, the nursery body 401 and the two tails 402 and 403 are sequentially stored in memory and separated by the addresses 404 and 405 that marks the beginning and the end of the nursery body, 405 and 406 that marks a nursery tail, and 406 and 407 that marks the other nursery tail. If the three spaces are equally sized it is possible to use round robin to decide which space to leave for the next young collection. In one embodiment the three spaces within the nursery are of equal size. The usage pattern begins with step 408, where allocation proceeds from 404 to 406 and then the spaces 404 to 405 and 406 to 407 are garbage collected. This leaves the space 405 to 406 until the next young collection. In the next step, it leaves the space 404 to 405 and in the last step, it leaves the space 406 to 407 untouched. The pattern then repeats.

However, memory usage may be more efficient in accordance with another embodiment where one uses unequally sized spaces, and where the nursery body is larger than the nursery tails. When the spaces are of equal size, the effective nursery size is reduced to a third, but when the tails are much smaller than the body, though still large enough to contain a few transactions, the effective nursery size can be reduced with a much smaller amount, the size of a tail. In accordance with an embodiment, the usage pattern begins with step 411, where allocation proceeds from 404 to 406 and then the spaces 404 to 405 and 406 to 407 are garbage collected. In the next step 412, it allocates from 404 to 405 and 406 to 407. Then the spaces 404 to 406 are garbage collected. The pattern then repeats.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic or JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for nursery garbage collection in a virtual machine environment, comprising:
    a computer server that includes a microprocessor;
    a virtual machine for executing a software application;
    a memory space, divided into a multiple space nursery and an old space heap, for use by the virtual machine in storing software objects and pointers as part of the software application, wherein the multiple space nursery includes
        a nursery body space including a nursery body, and
        a plurality of nursery tail spaces, including a first nursery tail and a second nursery tail, each of which nursery tails are provided separately from each other and from the nursery body within the nursery, each of which nursery tails can also be garbage-collected separately from one another so that live objects therein are promoted to the old space heap;
    a nursery garbage collector that garbage collects the nursery spaces to reduce the promotion rate, including alternately garbage collecting within a selection of the nursery body, first nursery tail, and second nursery tail;
        wherein during execution of the software application, the system alternately selects one of the nursery tails within which to allocate the objects,
            allocates the objects in an order that includes the nursery body, and then the selected nursery tail,
            garbage collects a selection of the nursery body and nursery tails, leaving others of the nursery body and nursery tails until a subsequent nursery collection,
            allocates the objects in an order that includes the nursery body and the other nursery tail, and
            repeats the object allocation and garbage collection with different selections and orders of allocation of the objects within the nursery body and the nursery tails; and
    an old space garbage collector, that subsequently garbage collects objects that have been promoted to the old space heap.

2. The system of claim 1 wherein the multiple space nursery is provided as a three space nursery that includes a nursery body and two or more nursery tails, and wherein the nursery garbage collector alternately selects and garbage collects, during each nursery collection, the nursery body and a selected one of the nursery tails, to reduce the promotion rate.

3. The system of claim 2 wherein during nursery collection the nursery body and the selected nursery tail are garbage collected and all live objects found within these two spaces are promoted to the old space heap, and wherein additional objects in the non-selected nursery tail are not promoted, but are instead saved in the nursery until the next young collection.

4. The system of claim 2 wherein the three nursery spaces are divided into a body and two tails and wherein the body is larger than a tail.

5. The system of claim 2 wherein the three nursery spaces are divided into a body and two tails and wherein the size of the tails compared to the body can be tuned to adapt to the application behavior.

6. The system of claim 1 wherein during the execution of the software application, the system alternately
    allocates objects to the nursery body and the first nursery tail,
    garbage collects the second nursery tail, leaving the first nursery tail until a subsequent nursery collection,
    allocates objects to the nursery body and the second nursery tail,
    garbage collects the first nursery tail, leaving the second nursery tail until a subsequent nursery collection, and
    repeats the object allocation and garbage collection of the nursery body and tails as required.

7. The system of claim 1 wherein
    the multiple space nursery is provided as a three space nursery that includes a nursery body and two or more nursery tail, and
    the nursery garbage collector alternately selects and garbage collects, during each nursery collection, the nursery body and a selected one of the nursery tails, and
    during the execution of the software application, the system alternately allocates objects to the nursery body and the first nursery tail, garbage collects the second nursery tail, leaving the first nursery tail until a subsequent nursery collection, allocates objects to the nursery body and the second nursery tail, garbage collects the first nursery tail, leaving the second nursery tail until a subsequent nursery collection, and repeats the object allocation and garbage collection of the nursery body and tails as required.

8. A method for nursery garbage collection in a virtual machine environment, comprising the steps of:

providing a virtual machine for executing a software application;

providing a memory space, divided into a multiple space nursery and an old space heap, for use by the virtual machine in storing software objects and pointers as part of the software application, wherein the multiple space nursery includes a nursery body space including a nursery body, and a plurality of nursery tail spaces, including a first nursery tail and a second nursery tail, each of which nursery tails are provided separately from each other and from the nursery body within the nursery, each of which nursery tails can also be garbage-collected separately from one another so that live objects therein are promoted to the old space heap;

using a nursery garbage collector that garbage collects the nursery spaces to reduce the promotion rate, including alternately garbage collecting within a selection of the nursery body, first nursery tail, and second nursery tail;

during execution of the software application, alternately selecting one of the nursery tails within which to allocate the objects, allocating the objects in an order that includes the nursery body, and then the selected nursery tail, garbage collecting a selection of the nursery body and nursery tails, leaving others of the nursery body and nursery tails until a subsequent nursery collection, allocating the objects in an order that includes the nursery body and the other nursery tail, and repeating the object allocation and garbage collection with different selections and orders of allocation of the objects within the nursery body and the nursery tails; and subsequently garbage collecting objects that have been promoted to the old space heap.

9. The method of claim 8 wherein the multiple space nursery is provided as a three space nursery that includes a nursery body and two or more nursery tails, and wherein the nursery garbage collector alternately selects and garbage collects, during each nursery collection, the nursery body and a selected one of the nursery tails, to reduce the promotion rate.

10. The method of claim 9 wherein during nursery collection the nursery body and the selected nursery tail are garbage collected and all live objects found within these two spaces are promoted to the old space heap, and wherein additional objects in the non-selected nursery tail are not promoted, but are instead saved in the nursery until the next young collection.

11. The method of claim 9 wherein the three nursery spaces are divided into a body and two tails and wherein the body is larger than a tail.

12. The method of claim 9 wherein the three nursery spaces are divided into a body and two tails and wherein the size of the tails compared to the body can be tuned to adapt to the application behavior.

13. The method of claim 8, wherein during the execution of the software application, the method includes allocating objects to the nursery body and the first nursery tail, garbage collecting the second nursery tail, leaving the first nursery tail until a subsequent nursery collection, allocating objects to the nursery body and the second nursery tail, garbage collecting the first nursery tail, leaving the second nursery tail until a subsequent nursery collection, and repeating the object allocation and garbage collection of the nursery body and tails as required.

14. The method of claim 8, wherein the multiple space nursery is provided as a three space nursery that includes a nursery body and two or more nursery tails, and the nursery garbage collector alternately selects and garbage collects, during each nursery collection, the nursery body and a selected one of the nursery tails, and during the execution of the software application, the system alternately allocates objects to the nursery body and the first nursery tail, garbage collects the second nursery tail, leaving the first nursery tail until a subsequent nursery collection, allocates objects to the nursery body and the second nursery tail, garbage collects the first nursery tail, leaving the second nursery tail until a subsequent nursery collection, and repeats the object allocation and garbage collection of the nursery body and tails as required.

15. A non-transitory computer readable medium, including instructions stored thereon which when executed cause the computer to perform the steps of:

providing a virtual machine for executing a software application;

providing a memory space, divided into a multiple space nursery and an old space heap, for use by the virtual machine in storing software objects and pointers as part of the software application, wherein the multiple space nursery includes a nursery body space including a nursery body, and a plurality of nursery tail spaces, including a first nursery tail and a second nursery tail, each of which nursery tails are provided separately from each other and from the nursery body within the nursery, each of which nursery tails can also be garbage-collected separately from one another so that live objects therein are promoted to the old space heap;

using a nursery garbage collector that garbage collects the nursery spaces to reduce the promotion rate, including alternately garbage collecting within a selection of the nursery body, first nursery tail, and second nursery tail;

during execution of the software application, alternately selecting one of the nursery tails within which to allocate the objects, allocating the objects in an order that includes the nursery body, and then the selected nursery tail, garbage collecting a selection of the nursery body and nursery tails, leaving others of the nursery body and nursery tails until a subsequent nursery collection, allocating the objects in an order that includes the nursery body and the other nursery tail, and repeating the object allocation and garbage collection with different selections and orders of allocation of the objects within the nursery body and the nursery tails; and subsequently garbage collecting objects that have been promoted to the old space heap.

16. The non-transitory computer readable medium of claim 15 wherein the multiple space nursery is provided as a three space nursery that includes a nursery body and two or more nursery tails, and wherein the nursery garbage collector alternately selects and garbage collects, during each nursery collection, the nursery body and a selected one of the nursery tails, to reduce the promotion rate.

17. The non-transitory computer readable medium of claim 16 wherein during nursery collection the nursery body and the selected nursery tail are garbage collected and all live objects found within these two spaces are promoted to the old space heap, and wherein additional objects in the non-selected nursery tail are not promoted, but are instead saved in the nursery until the next young collection.

18. The non-transitory computer readable medium of claim 16 wherein the three nursery spaces are divided into a body and two tails and wherein the body is larger than a tail.

19. The non-transitory computer readable medium of claim 16 wherein the three nursery spaces are divided into a body and two tails and wherein the size of the tails compared to the body can be tuned to adapt to the application behavior.

20. The non-transitory computer readable medium of claim 15 wherein during the execution of the software application, the steps include
   allocating objects to the nursery body and the first nursery tail,
   garbage collecting the second nursery tail, leaving the first nursery tail until a subsequent nursery collection,
   allocating objects to the nursery body and the second nursery tail,
   garbage collecting the first nursery tail, leaving the second nursery tail until a subsequent nursery collection, and
   repeating the object allocation and garbage collection of the nursery body and tails as required.

* * * * *